Patented Feb. 3, 1931

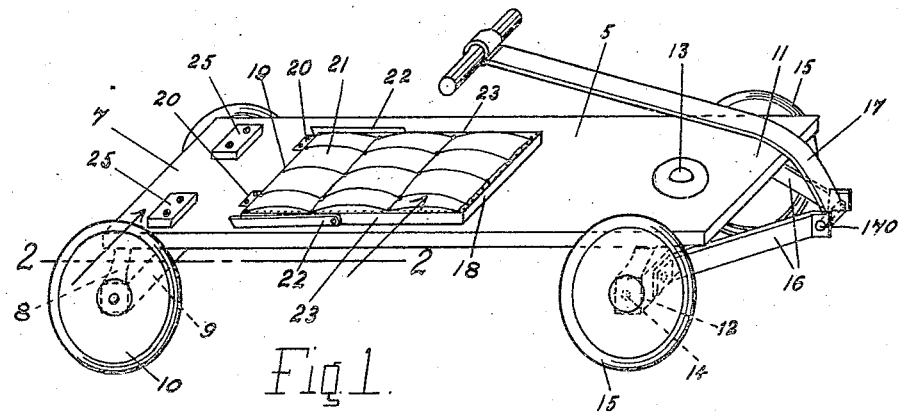

1,791,391

UNITED STATES PATENT OFFICE

RICHARD C. TOWNSEND, OF CANTON, AND PHILIP C. ROETTINGER, OF WYOMING, OHIO

CHILD'S VEHICLE

Application filed September 8, 1928. Serial No. 304,792.

This invention relates to a combination knee pad and back rest for a child's vehicle, commonly known as a coaster.

An object of the invention is to provide a vehicle body with padded means upon which an operator may rest the knee of one leg while propelling the device, with his free leg, said padded means being inclinable at will to provide a back rest for the operator while in sitting position upon the vehicle.

Another object is to provide a device for the purposes stated which will be simple of operation and inexpensive of manufacture.

These and other objects are attained by the means described herein and disclosed in the accompanying drawings, in which:

Fig. 1 is an isometric view of a child's vehicle embodying the invention.

Fig. 2 is a cross-sectional view on line 2—2 of Fig. 1 showing the padded means in lowered position.

Fig. 3 is a view similar to that of Fig. 2, showing the device in the inclined position whereby to form a back rest.

The device of the present invention is adapted for use upon any child's vehicle of the general type illustrated in the drawings. The body portion 5 of the vehicle should, of course, be of such height that an operator may conveniently reach the pavement or floor with one foot while resting the knee of the other leg upon the padded member 6, when said member is in the lowered position indicated in Fig. 1.

The vehicle, commonly known as a coaster, comprises a substantially horizontal body portion 5, of flat material such as wood or steel. The body portion, if desired, may be provided with the usual upwardly extending sides such as are carried by a toy wagon or the like, although the preferable form of coaster has no sides. The rear end 7 of the body portion 5 has secured thereto suitable brackets 8 upon which may be mounted an axle 9 carrying freely rotatable wheels 10.

The forward end 11 of the body portion supports any suitable type of steering mechanism. For the purpose of explanation, a simple steering arrangement is shown in Fig. 1. Said steering mechanism comprises an axle support member 12 pivotally mounted at its mid point upon a king bolt 13 passing through the body portion as indicated in Fig. 1. A dead axle 14, secured to the member 12, is adapted to receive wheels 15. Braces 16 are rigidly mounted on the member 12 and extend forwardly beyond the body 5. Said braces are adapted to pivotally support a steering handle 17 as shown at 170. Handle 17 thereby provides a means for pulling the vehicle as well as for steering it. The steering mechanism, as stated before, may be constructed in any other suitable manner, as it forms no part of the instant invention.

The combination back rest and knee pad, indicated at 6 on the drawings, comprises a board or other substantially flat member 18 hingedly mounted upon the body portion along one edge 19. Any suitable type of hinge 20 may be employed for the purpose. Padding, indicated at 21, is secured to one flat surface of board 18 to provide a cushion upon which the operator may rest his knee while propelling the coaster. By moving the member 6 about the hinge connections, it may be disposed in the positions indicated in Figs. 2 and 3. The representation in Fig. 2 shows member 6 in lowered position with pad or cushion 21 disposed face upward for receiving the knee of the operator as he propels the vehicle with one foot.

Member 6 is retained in the position indicated in Fig. 3, by means of a pair of stays 22 pivotally mounted as at 24 upon the opposite sides 23 of member 18. Stays 22 are adapted to be disposed rearwardly of the back rest, as shown in Fig. 3, for abutting cooperative blocks 25 suitably fastened to body 5. It should be noted that the stays 22 are of a length greater than the distance between pivotal point 24 and hinge pin 20. The purpose of the above construction is to provide for automatic positioning of the stays 22. It should be clearly evident that as the member 18 is moved from one operative position to the other, shown in Figs. 2 and 3, the ends 26 of the stays will slide upon and remain in abutment with the body 5. Manual positioning of the stays 22 is thereby eliminated.

Abutment of the stays 22 upon the blocks 25 permits a predetermined degree of inclination of board 18 relative to the seat or body portion 5. As shown in Fig. 2, the stays, when not in use, assume a position in close proximity with the edges 23 of board 18. The free end 26 of each stay may be cut on a bias, as indicated, to insure substantial abutment of the stay upon the blocks and body portion. It is to be understood that a single stay may be provided in lieu of the pair of stays, by making slight alterations in the mounting thereof upon the board 18.

It is to be understood that various changes may be made in the structural details of the device without departing from the spirit and scope of the invention as set forth in the appended claims.

What is claimed is:

1. In a child's vehicle adapted for propulsion by the action of the leg of an operator, the combination of a flat and sideless body portion, an inclinable member hingedly mounted upon the body portion transversely thereof and adapted normally to lie forwardly in a plane substantially parallel to the plane of the body portion, padding material on the inclinable member and upon which the knee may be placed during the propelling movement, and self-positioning means for supporting the inclinable member in inclined position whereby to form a back rest disposed at an angle to the body portion.

2. In a child's vehicle adapted for propulsion by the action of the leg of an operator, the combination of a flat and sideless body portion, an inclinable member having an upper and a lower surface and adapted normally to lie forwardly in a plane substantially parallel to the plane of the body portion and in close proximity therewith, padding material upon the top surface of the inclinable member for forming a knee pad upon which the knee of the operator may rest during the propelling movement, and support means comprising pivotally mounted stays for retaining the inclinable member in inclined position whereby to form a back rest disposed at an angle to the body member.

3. In a child's vehicle, the combination of a flat and sideless body portion, an inclinable member hingedly mounted transversely of the body portion and intermediate the ends thereof, said member being padded upon its rear and adapted normally to lie forwardly upon the body portion for providing a knee rest, and means comprising stays and abutment means for retaining the inclinable member in an inclined position whereby to form a back rest.

In testimony whereof, we have hereunto subscribed our names on the fifth day of September, 1928 and on the fourth day of September, 1928.

RICHARD C. TOWNSEND.
PHILIP C. ROETTINGER.